United States Patent
Bobba et al.

(10) Patent No.: US 9,902,351 B2
(45) Date of Patent: Feb. 27, 2018

(54) HYBRID BUMPER BEAMS AND METHODS FOR MAKING AND USING THE SAME

(71) Applicant: SABIC GLOBAL TECHNOLOGIES B.V., Bergen op Zoom (NL)

(72) Inventors: Somasekhar Venkat Bobba, Bangalore (IN); Matthew D. Marks, Waterford, MI (US); Dhanendra Kumar Nagwanshi, Farmington Hills, MI (US)

(73) Assignee: SABIC GLOBAL TECHNOLOGIES B.V, Bergen op Zoom (NL)

( * ) Notice: Subject to any disclaimer, the term of this patent is extended or adjusted under 35 U.S.C. 154(b) by 0 days.

(21) Appl. No.: 15/300,441

(22) PCT Filed: Mar. 31, 2015

(86) PCT No.: PCT/US2015/023486
§ 371 (c)(1),
(2) Date: Sep. 29, 2016

(87) PCT Pub. No.: WO2015/153547
PCT Pub. Date: Oct. 8, 2015

(65) Prior Publication Data
US 2017/0182959 A1    Jun. 29, 2017

Related U.S. Application Data

(60) Provisional application No. 61/972,814, filed on Mar. 31, 2014.

(51) Int. Cl.
*B60R 19/18* (2006.01)
*F16F 7/12* (2006.01)

(52) U.S. Cl.
CPC ............... *B60R 19/18* (2013.01); *F16F 7/12* (2013.01); *B60R 2019/1833* (2013.01)

(58) Field of Classification Search
CPC .................................. B60R 19/18; F16F 7/12
(Continued)

(56) References Cited

U.S. PATENT DOCUMENTS

| 5,129,197 A | 7/1992 | Tyler et al. |
| 6,308,999 B1 | 10/2001 | Tan et al. |

(Continued)

FOREIGN PATENT DOCUMENTS

| CN | 201849439 U | 6/2011 |
| CN | 201895638 U | 7/2011 |

(Continued)

OTHER PUBLICATIONS

Chinese Patent No. 201849439; Publication Date: Jun. 1, 2011; Abstract Only, 1 page.

(Continued)

*Primary Examiner* — Joseph D. Pape
(74) *Attorney, Agent, or Firm* — Cantor Colburn LLP

(57) ABSTRACT

A method of making a hybrid energy absorbing beam, comprises: forming a polymer member comprising a first portion, wherein the first portion includes a first ledge and a connecting ledge connected by a first portion wall; and a rib extending from the first portion wall, wherein a cross-section of the rib taken along a line, A-A, comprises a first channel formed from an opening between a channel wall and a first traverse wall of a lobe, wherein the lobe comprises the first traverse wall and a second traverse wall with a connecting wall disposed between the first traverse wall and the second traverse wall; wherein the first channel extends along a portion of a length, $L_p$, of the polymer member; and forming a metal/composite member; and attaching the polymer member to the metal/composite member on an opposite side of the polymer member as the connecting wall.

20 Claims, 11 Drawing Sheets

(58) Field of Classification Search
USPC .......................................................... 293/120
See application file for complete search history.

(56) References Cited

U.S. PATENT DOCUMENTS

| | | | |
|---|---|---|---|
| 6,669,252 | B2 | 12/2003 | Roussel et al. |
| 7,044,515 | B2 * | 5/2006 | Mooijman .............. B60R 19/18 293/102 |
| 8,851,539 | B2 * | 10/2014 | Mana ...................... B60R 19/18 293/120 |
| 2003/0020291 | A1 | 1/2003 | Roussel et al. |
| 2003/0132647 | A1 | 7/2003 | Cooper |
| 2004/0094975 | A1 | 5/2004 | Shuler |
| 2004/0262931 | A1 | 12/2004 | Roussel et al. |
| 2006/0181089 | A1 | 8/2006 | Andre et al. |
| 2007/0257497 | A1 | 11/2007 | Heatherington et al. |
| 2013/0175813 | A1 | 7/2013 | Mana |

FOREIGN PATENT DOCUMENTS

| | | |
|---|---|---|
| EP | 0652138 A1 | 5/1995 |
| EP | 1369308 A1 | 12/2003 |
| EP | 1291266 B1 | 4/2008 |
| KR | 101026962 B1 | 4/2011 |
| KR | 2011096756 A | 8/2011 |
| KR | 101090924 B1 | 12/2011 |
| KR | 1020120029950 A | 3/2012 |
| KR | 101170285 B1 | 7/2012 |
| WO | 2007076096 A2 | 7/2005 |

OTHER PUBLICATIONS

Chinese Patent No. 201895638; Publication Date: Jul. 13, 2011; Abstract Only, 1 page.
European Patent No. 1291266; Publication Date: Mar. 12, 2003; Abstract Only, 1 page.
European Patent No. 1369308; Publication Date: Dec. 10, 2003; Abstract Only, 1 page.
International Search Report for International Application No. PCT/US2015/023486; dated Jul. 9, 2015; 5 pages.
Korean Patent No. 101026962; Publication Date: Apr. 11, 2011; Abstract Only, 1 page.
Korean Patent No. 101170285; Publication Date: Jul. 31, 2012; Abstract Only, 1 page.
Korean Patent No. 1020120029950; Publication Date: Mar. 27, 2012; Abstract Only, 2 pages.
Korean Patent No. 2011096756; Publication Date: Mar. 27, 2012; Abstract Only, 6 pages.
Written Opinion of the International Search Report for International Application No. PCT/US2015/023486; dated Jul. 9, 2015; 5 pages.
Korean Patent No. 101090924; Publication Date: Dec. 8, 2011; Abstract Only, 2 pages.

* cited by examiner

HYBRID BUMPER BEAMS AND METHODS FOR MAKING AND USING THE SAME

CROSS REFERENCE TO RELATED APPLICATIONS

This application is a 371 of International Application No. PCT/US2015/023486, filed Mar. 31, 2015, which claims priority to U.S. Application No. 61/972,814, filed Mar. 31, 2014 both which are incorporated herein by reference in their entirety.

BACKGROUND

There is an increasing emphasis reducing injury in automobile-pedestrian collisions. In the case of low speed collisions, energy absorbers can be used in bumpers and can absorb the energy to reduce vehicle damage and provide vehicle safety, while reducing injury to pedestrians as well.

Varying performance requirements for vehicles have been established by organizations such as the United States Federal Motor Vehicle Safety Standard (FMVSS), Insurance Institute for Highway Safety (IIHS), the Research Council for Automobile Repairs (RCAR), and the economic commission for Europe (ECE). Regulations governing the low-speed damageability requirements for automobiles across the globe are different. For example, in Europe and the Pacific region, vehicles have to meet ECE 42 and RCAR standards at both the front and rear side of the vehicle. In the U.S., vehicles have to pass FMVSS part 581, RCAR & IIHS deformable barrier impact tests.

For an automobile manufacturer, or a supplier, it is important to develop a cost-effective solution capable of meeting multiple requirements. Accordingly, bumper beams that can meet safety standards, are lightweight, and can be manufactured in a cost-effective manner are desired.

BRIEF DESCRIPTION

Disclosed herein are hybrid energy absorbing beams, articles including the beams, and methods of making and using the same.

A hybrid energy absorbing beam for attachment to a vehicle, comprises: a polymer member, wherein the polymer member comprises a first portion, wherein the first portion includes a first ledge and a connecting ledge connected by a first portion wall; and a rib extending from the first portion wall, wherein a cross-section of the rib taken along a line, A-A, comprises a first channel formed from an opening between a channel wall and a first traverse wall of a lobe, wherein the lobe comprises the first traverse wall and a second traverse wall with a connecting wall disposed between the first traverse wall and the second traverse wall; wherein the first channel extends along a portion of a length, $L_p$, of the polymer member; and a metal/composite member coupled to the polymer member on an opposite side of the polymer member as the connecting wall.

A method of making a hybrid energy absorbing beam, comprises: forming a polymer member comprising a first portion, wherein the first portion includes a first ledge and a connecting ledge connected by a first portion wall; and a rib extending from the first portion wall, wherein a cross-section of the rib taken along a line, A-A, comprises a first channel formed from an opening between a channel wall and a first traverse wall of a lobe, wherein the lobe comprises the first traverse wall and a second traverse wall with a connecting wall disposed between the first traverse wall and the second traverse wall; wherein the first channel extends along a portion of a length, $L_p$, of the polymer member; and forming a metal/composite member; and attaching the polymer member to the metal/composite member on an opposite side of the polymer member as the connecting wall.

Also included herein are bumper beam assemblies comprising the components.

BRIEF DESCRIPTION OF THE DRAWINGS

Refer now to the drawings, which are exemplary, not limiting, and wherein like elements are numbered alike in several figures.

DETAILED DESCRIPTION

Figure 1:
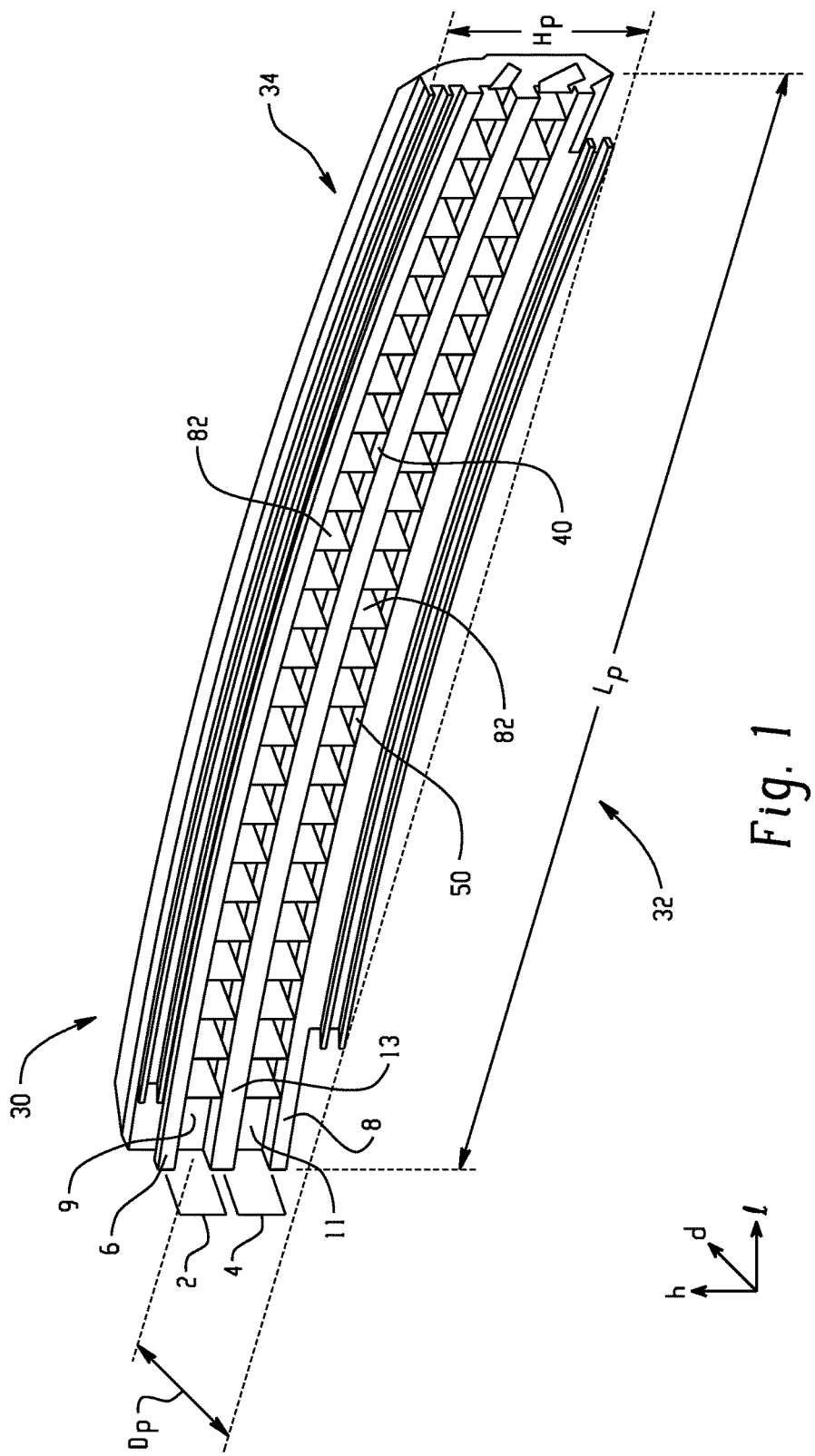
FIG. 1 illustrates a polymer member.

A hybrid energy absorbing beam can include a combination of a polymer member and a metal/composite member (e.g., metal member, composite member, or a metal member and a composite member) to provide a light-weight energy absorbing beam that can efficiently absorb impact energy associated with vehicle collisions with a pedestrian, another vehicle, an object, etc. It can be expensive to repair vehicle components damaged during low or moderate speed collisions, including the tailgate, engine components, bumper, lights, etc. It can be dangerous for a pedestrian to collide with a moving vehicle since medical impairments such as broken limbs, bruises, etc. can occur. A hybrid energy absorbing beam including a combination of a polymer member and a metal/composite member can reduce damage to the pedestrians and/or vehicles involved in low-speed collisions. Such a hybrid beam can reduce damage to vehicles and/or objects involved in moderate speed collisions. There are many specifications a bumper beam can meet, including regional safety specifications, internal development specifications, etc. These specifications can vary between locations (e.g., United States and Europe) where the vehicle is sold. Thus, it can be desirable for an energy absorbing beam to meet most global bumper safety requirements. A hybrid energy absorbing beam including a combination of a polymer member and a metal/composite member can meet most global bumper safety requirements, e.g., ECE 42 center pendulum tests and/or IIHS 10 kilometer per hour (km/hr) impact tests.

A polymer member of the hybrid energy absorbing beam can include a channel and ribs. A polymer member can have an open portion and a closed portion where the open portion faces the metal/composite member. Stated another way, a polymer member can have a front portion facing the fascia of a bumper beam and a back portion, where the metal/composite member can be attached to the back portion of the polymer member. A polymer member can have a height, $H_p$, measured along an h-axis dimension, a length, $L_p$, measured along an l-axis dimension, and a depth, $D_p$, measured along an d-axis dimension.

A channel of the polymer member can be formed from an open portion located between a stiffening element of the polymer member and a lobe including a first traverse wall, a second traverse wall, and a connecting wall extending between the first and second traverse walls, where the channel can be located between the first traverse wall of the lobe and a channel wall of the stiffening element. Ribs can be disposed within the channel and can provide structural reinforcement (e.g., rigidity, torsional stiffness, and the like) to the polymer member, which in turn can reduce deflection of the hybrid energy absorbing beam during a vehicle collision. Ribs can extend within the channel across the length of the polymer member.

A polymer member can include any number of channels that will provide the desired impact properties, while the channel can have any desired shape, size, and/or wall thickness to achieve the desired energy absorption characteristics of the hybrid energy absorbing beam.

The cross-sectional shape of a lobe (perpendicular to the length of the polymer member) can be any shape. The first and second traverse walls, and/or connecting walls of a lobe can be straight or curved, i.e., can have a straight or curved cross-sectional shape, or profile. The first, second, and/or connecting walls of the lobe can form a C-like or U-like shape. The lobe can include only first and second traverse walls, i.e., free of a connecting wall, such that the first and second traverse walls directly contact one another, at an open side of the channel. In this way, a V-like cross-sectional shape can be formed by straight first and second traverse walls, or a C-like or U-like cross-sectional shape can be formed by curved first and second traverse walls.

A lobe can have any size and/or open volume (or open area in cross-section). The lobe can have a height, $H_c$, measured along an h-axis dimension, a length, $L_c$, measured along an l-axis dimension, and a depth, $D_c$, measured along a d-axis dimension. The height ($H_c$) of a lobe can be greatest along an open side of the lobe, forming a converging lobe. Conversely, the height of channel, $H_h$, can be greatest at a closed side of the channel (i.e., toward the metal/composite member), forming a diverging channel. Optionally, a bulbous or diverging/converging lobe can be formed where the height ($H_c$) of the lobe can be greatest at a point along the lobe's depth and not at the open side or at the closed side of the channel.

The stiffening member of the polymer member can include a base (i.e., base wall or flange) extending from a traverse wall of the lobe along the closed side of the channel (i.e., where the side of the polymer member closest to the metal/composite member). A base can extend above a first traverse wall (away from a lobe in an h-axis direction) and/or a base can extend below a second traverse wall (away from a lobe in an h-axis direction).

The first traverse wall of the lobe can extend from the open side of the polymer member at an angle, $\alpha_u$, measured clockwise relative to a reference plane defined by the h-l plane in the attached figures (i.e., vertical reference plane). The angle $\alpha_u$ can be 10 degrees to 170 degrees. The angle $\alpha_u$ can be 30 degrees to 150 degrees. The angle $\alpha_u$ can be 90 degrees to 135 degrees.

The second traverse wall of the lobe can extend from the open side of the polymer member at an angle, $\alpha_l$, measured clockwise relative to a reference plane defined by the h-l plane in the attached figures (i.e., vertical reference plane). The angle $\alpha_l$ can be 10 degrees to 170 degrees. The angle $\alpha_l$ can be 30 degrees to 150 degrees. The angle $\alpha_l$ can be 45 degrees to 90 degrees.

The connecting wall of the lobe can extend between the first traverse and second traverse walls of the lobe at an angle, $\alpha_c$, measured clockwise relative to a reference plane defined by the h-l plane in the attached figures (i.e., vertical reference plane). The angle $\alpha_c$ can be 100 degrees to 270 degrees. The angle $\alpha_c$ can be 130 degrees to 230 degrees. The angle $\alpha_c$ can be 135 degrees to 225 degrees.

The angles $\alpha_u$ can change along the depth of the first traverse wall, i.e., the first traverse wall can be curved, while the angles $\alpha_l$ can change along the depth of the second traverse wall, i.e., the second traverse wall can be curved. The first traverse wall can mirror the second traverse wall such that the addition of the angles $\alpha_u$ and $\alpha_l$ equals 180 degrees. The connecting wall can optionally extend non-parallel to a reference plane defined by the h-l plane in the attached figures (i.e., vertical reference plane). The length of the first traverse wall of a channel, $l_u$, can be different than or the same as the length of the second traverse wall of a channel, $l_l$.

More than one lobe and more than one channel can be present in the polymer member. For example, two lobes and two stiffening elements can be present in the polymer member where a channel is formed between each lobe and each polymer member (i.e., a first channel and a second channel). An additional channel can be formed between two lobes to create a third channel in the polymer member. An open space between a first lobe and a second lobe can be formed by a base portion (e.g., a middle base portion) extending between the first lobe and the second lobe. The third channel can have the same or different dimensions as the first and/or second channels. Curved portions can extend from either end or side of the middle base portion and can connect to a first base portion or a second base portion.

A base portion can extend from a traverse wall of a channel at an angle, $\alpha_{bi}$, where "i" represents the $i^{th}$ section of the base. In other words, a portion of the base can extend from the first traverse wall, from the second traverse wall, and/or can connect the first traverse wall of one lobe to the second traverse wall of another lobe or vice versa. A portion of a base can extend at an angle, $\alpha_{bi}$, measured clockwise relative to a reference plane defined by the h-l plane in the attached figures and intersecting a channel wall and the base (i.e. a vertical reference plane through the point where a channel wall intersects a portion of a base). The angle, $\alpha_{bi}$, of each section of the base can be different or can be the same. The angle, $\alpha_{bi}$, can be 0 degrees to 360 degrees. The shape of the base can correspond to the shape of the metal/composite member, i.e., the shape of the base can be configured to mate with the shape of the metal/composite member.

The angles ($\alpha_u$, $\alpha_l$, $\alpha_c$, and $\alpha_{bi}$), lengths ($l_l$ and $l_u$), depth ($D_c$), and the height ($H_c$) can vary along the length, $L_p$, of the polymer member (as measured in the l-axis dimension in the attached figures), such that these parameters can be different at two different cross-sections of the polymer member (i.e., at cross-sections taken at two different points along the length of the polymer member).

Within each channel, a plurality of ribs can be disposed. For example, ribs can extend between the first traverse wall of the first lobe and the channel wall of the stiffening element, between the second traverse wall of the first lobe and the first traverse wall of the second lobe, and/or between the second traverse wall of the second lobe and the channel wall of the stiffening element. Ribs can extend from the connecting wall of the lobes.

Ribs disposed in adjacent channels and/or on adjacent lobes can be substantially parallel (e.g., nearly 90 degrees apart from one another). The ribs can be configured to have a generally C-shaped cross-section to complement the lobes when the lobes have a generally C-shaped cross-section essentially creating a dual layer C-section shaped lobes. The C-shaped cross-section can be based upon the available packaging space in the channel. The packaging space can be 25 mm to 150 mm. The packaging space can be 50 mm to 110 mm. The packaging space can be 75 mm to 100 mm. Such a dual layer C-section shaped lobes can provide controlled and efficient energy absorption.

The polymer member can be curved along its length and/or height (along the l-axis dimension and/or h-axis dimension) to correspond to curvature(s) present in the metal/composite member. The polymer member can be disposed adjacent to the metal/composite member, e.g., the polymer member can be in mechanical communication with a metal/composite member. The polymer member can abut a metal/composite member along the open side of the polymer member. When a base is present in the polymer member, the polymer member can be positioned such that the base is in mechanical communication with a metal/composite member. The metal/composite member can be inserted within, fastened to (e.g., snap fit, screw and bolt, adhesion), or over-molded to the polymer member.

The polymer member can include extensions on either end of the polymer member where the extensions extend from the base away from the lobes and/or channels (from the open side of the polymer member). Extensions can be used to engage and/or cover portions of the metal/composite member and can optionally be shaped complimentary to the metal/composite member to facilitate attachment of the metal/composite member to the polymer member.

Optionally, the polymer member can comprise stiffening elements extending from the base. Stiffening elements can extend from the base and/or along the base, in the d-axis dimension and/or h-axis dimension. A stiffening element can extend outwardly from the base toward the connecting wall of the lobe and/or can extend along a base in the h-axis dimension to the intersection of a traverse wall and the base. A plurality of stiffening elements can be positioned on an exterior surface (facing away from a metal/composite member) of the base adjacent a first traverse wall of a first channel and/or an exterior surface of the base adjacent a second traverse wall of a second channel closer to the ground, when the hybrid energy absorbing beam is in use on a vehicle. Stiffening elements can provide structural reinforcement (e.g., rigidity, torsional stiffness, and the like) to the polymer member of the hybrid energy absorbing beam. Stiffening elements can extend over the front portion of the polymer member.

By varying at least the number of lobes, the number of channels, the spacing of the first and second traverse walls of the lobe(s), the spacing of ribs within a channel(s) (spacing along the l-axis dimension), the thickness of the traverse walls and/or ribs, or a combination comprising at least one of the foregoing parameters the polymer member can be tuned to have different stiffness and impact characteristics during collisions.

The polymer member can comprise any polymeric material or combination of polymeric materials that can be formed into the desired shape and provide the desired properties. Exemplary materials include polymeric materials as well as combinations of polymeric materials with elastomeric materials, and/or thermoset materials. In one embodiment, the polymeric materials comprise thermoplastic materials. Possible polymeric materials include polybutylene terephthalate (PBT); acrylonitrile-butadiene-styrene (ABS); polycarbonate (LEXAN* and LEXAN* EXL resins, commercially available from SABIC's Innovative Plastics business); polyethylene terephthalate (PET); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX* resins, commercially available from SABIC's Innovative Plastics business); blends of polycarbonate/PET/PBT; PBT and impact modifier (XENOY* resins, commercially available from SABIC's Innovative Plastics business); polyamides; phenylene sulfide resins; polyvinyl chloride PVC; high impact polystyrene (HIPS); low/high density polyethylene (L/HDPE); polypropylene (PP); expanded polypropylene (EPP); polyethylene and fiber composites; polypropylene and fiber composites (AZDEL Superlite* sheets, commercially available from Azdel, Inc.); long fiber reinforced thermoplastics (VERTON* resins, commercially available from SABIC's Innovative Plastics business) thermoplastic olefins (TPO), and carbon fiber reinforced polymeric composites (CFRP), as well as combinations comprising at least one of the foregoing.

An exemplary filled resin is STAMAX* resin, which is a long glass fiber filled polypropylene resin also commercially available from SABIC's Innovative Plastics business. Some possible reinforcing materials include fibers, such as glass, carbon, and so forth, as well as combinations comprising at least one of the foregoing; e.g., long glass fibers and/or long carbon fiber reinforced resins. For example, carbon fiber reinforced polymeric composites can be utilized to form the polymer member. Carbon fiber reinforced polymeric composites can be used as a coating (e.g., skin) on the polymer member to provide the desired structural integrity to the polymer member. The energy absorbing elements can be formed from combinations comprising at least one of any of the above-described materials. For example, in some embodiments, the same material can be used to make each component of the polymer member (e.g. the traverse walls, and/or ribs). In other embodiments, different materials can be used to make the various components of the polymer member (e.g., one material can be used to make the traverse walls and a different material can be used to make the ribs). It is contemplated that any combination of materials can be used to, e.g., enhance crush characteristics, reduce damageability, etc.

The metal/composite member of the hybrid beam can have an open section or a closed section. The metal/composite member can have a substantially I-shaped cross-section or can have a substantially rectangular cross-section or can have a substantially C-like cross-sectional shape. The metal/composite member can comprise a metal or metal alloy. In a specific embodiment, the metal/composite member comprises steel alloy.

Turning now to the figures, FIG. 1 illustrates a polymer member 30. The polymer member 30 can have a length, $L_p$, measured along the l-axis dimension, a height, $H_p$, measured along the h-axis dimension, and a depth, $D_p$, measured along the d-axis dimension. The polymer member can have an open portion 32 and a closed portion 34. When in use, the open portion 32 can abut a metal/composite member 20 such that the metal/composite member 20 and the polymer member 30 are in mechanical communication with one another. First and second channels 40, 50, respectively can be present on the polymer member 30, with ribs 82 disposed between the channels 40, 50 and across the length of the polymer member 30 (i.e., across the l-axis dimension). The polymer member 30 can include a first portion 2 and a second portion 4 where the first portion 2 includes a first ledge 6 and a connecting ledge 13 connected by a first portion wall 9 and wherein the second portion 4 can include a second ledge 8 and the connecting ledge 13 connected by second portion wall 11.

Figure 2:
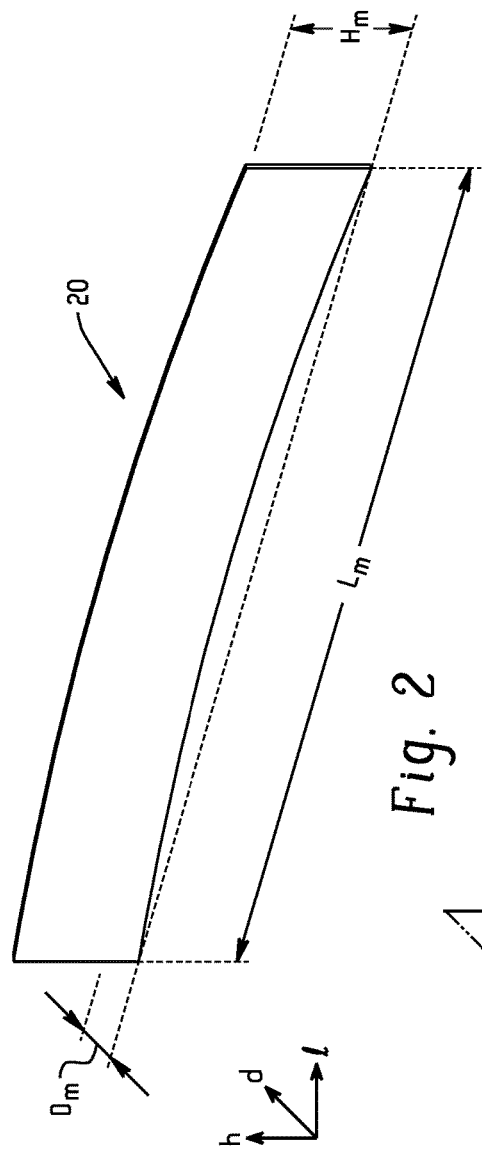
FIG. 2 illustrates a metal/composite member.

FIG. 2 illustrates a metal/composite member 20. The metal/composite member 20 can have a length, $L_m$, measured along the l-axis dimension, a height, $H_m$, measured along the h-axis dimension, and a depth, $D_m$, measured along the d-axis dimension.

Figure 3:
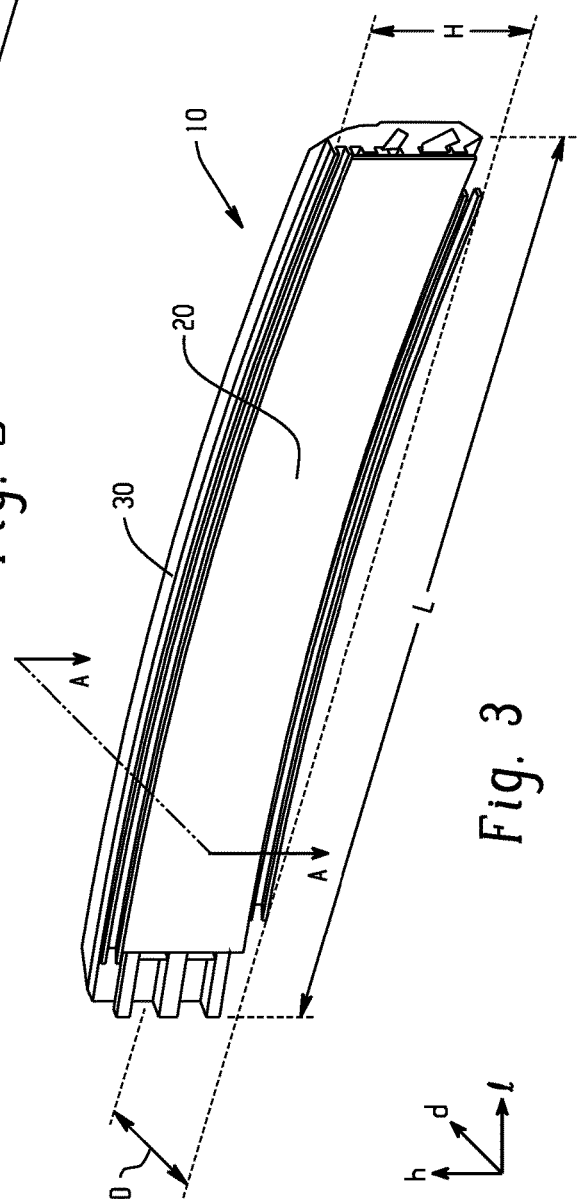
FIG. 3 illustrates a hybrid energy absorbing beam including the polymer member of FIG. 1 and the metal/composite member of FIG. 2.

FIG. 3 illustrates a hybrid beam energy absorber 10 formed from the polymer member 30 of FIG. 1 and the metal/composite member 20 of FIG. 2. The polymer member 30 and the metal/composite member 20 can be formed separate from one another or the polymer member 30 can be over-molded the metal/composite member 20. When formed separately, the polymer member 30 can be attached to the metal/composite member 20 via a mechanical attachment, e.g., snap-fit, screw and bolt, adhesive, and so forth. The hybrid energy absorbing beam 10 can have a length, L, measured along the l-axis dimension, a height, H, measured along the h-axis dimension, and a depth, $D_m$, measured along the d-axis dimension.

Figure 4:
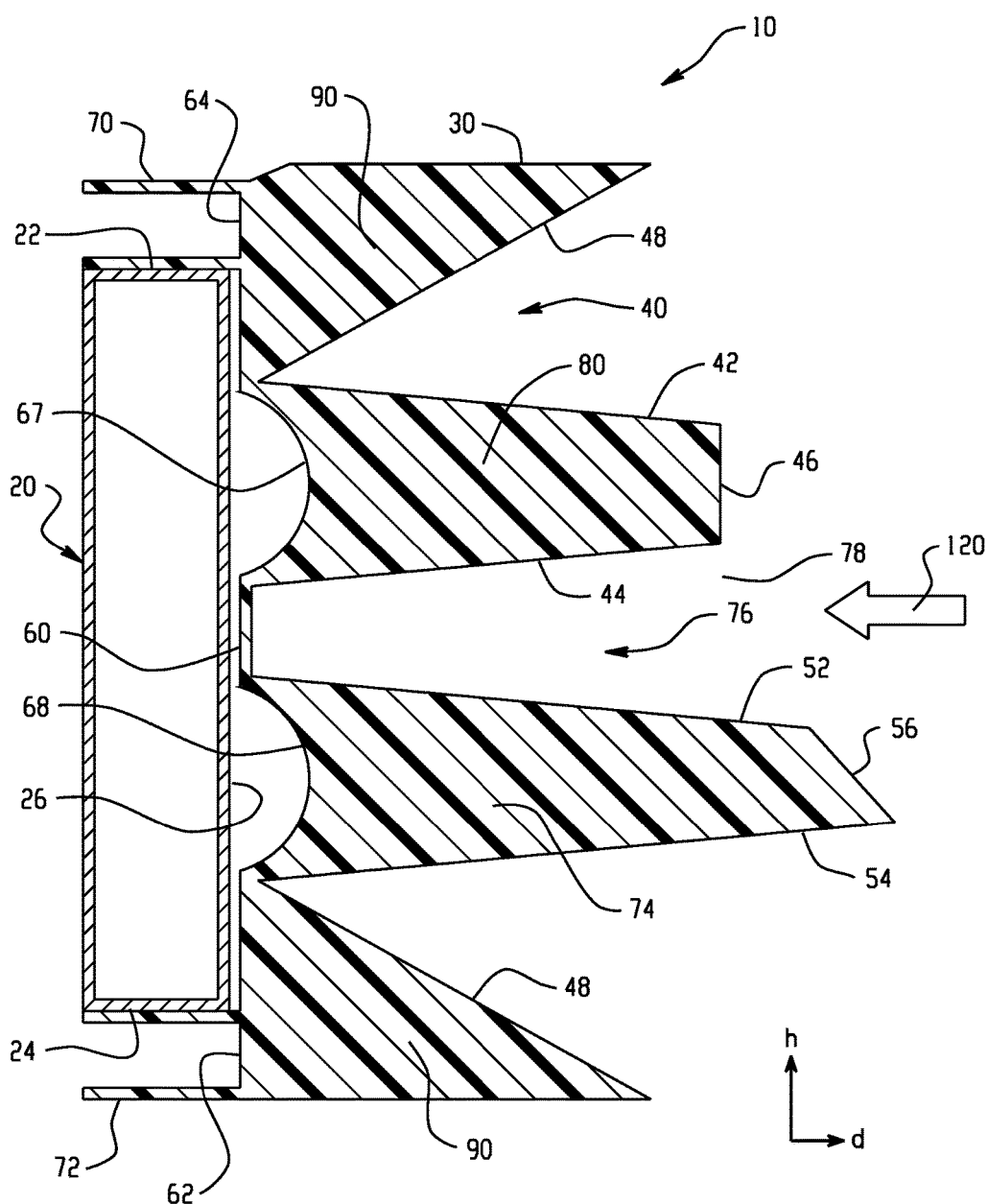
FIG. 4 illustrates a cross-sectional view of the hybrid energy absorbing beam of FIG. 3 taken along the A-A plane.
Figure 8:
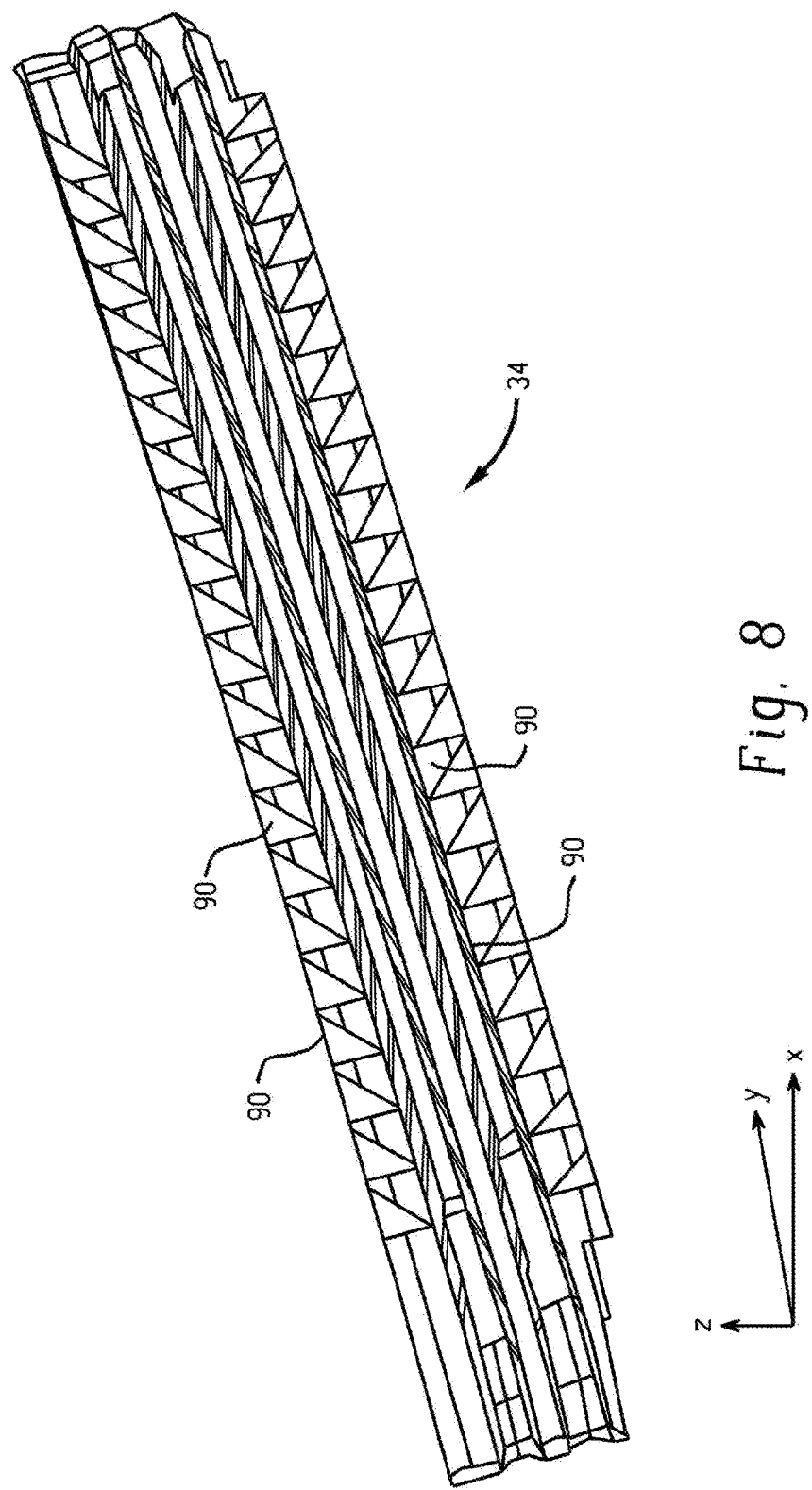
FIG. 8. is a front view of the polymer member of FIG. 1.
Figure 12:
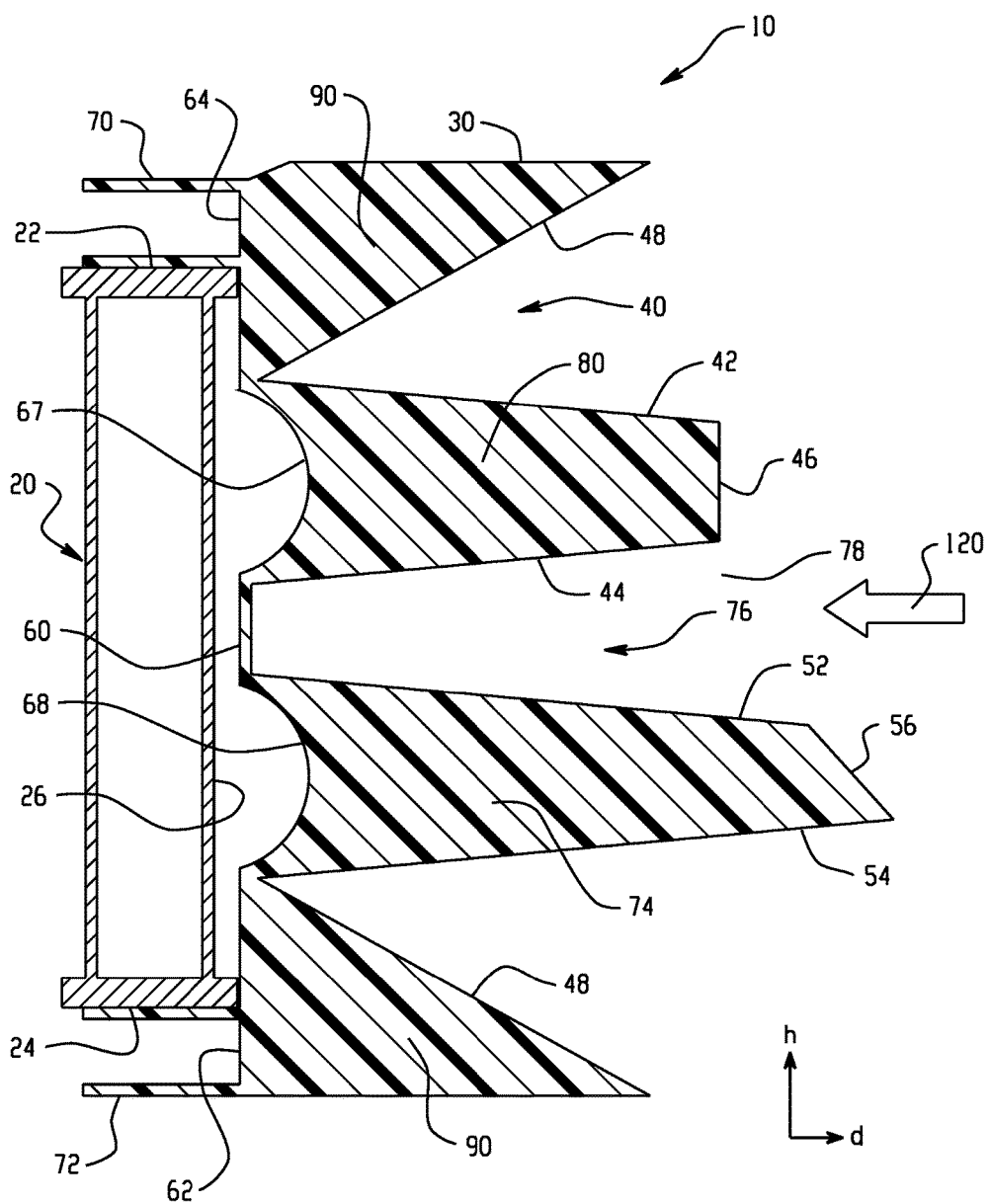
FIG. 12 illustrates a cross-sectional view of the hybrid energy absorbing beam of FIG. 3 taken along the A-A plane, where the metal and/or composite member has an "I" shaped cross-section.

FIG. 4 illustrates a cross-section of the hybrid energy absorbing beam 10 of FIG. 3 taken along the A-A plane of FIG. 3. The metal/composite member 20 can have a complimentary shape to the polymer member 30 to enable the polymer member 30 to be formed over or fit over the metal/composite member 20. For example, as illustrated in FIG. 2, the metal/composite member 20 can have a rectangular shape. As illustrated in FIG. 12, the metal composite member 20 can have an I-shaped cross-section. The polymer member 30 can be attached along a front side 26 of the metal/composite member 20, such that the polymer member 30 is adjacent to a side of the metal/composite member 20 closest to an impact direction 120. The polymer member 30 can include a first channel 40 and a second channel 50 as well as stiffening elements 90 on either or both sides of the channels 40, 50. Stiffening elements 90 are also illustrated in FIG. 8 on the closed portion 34 of the polymer member 30. Rib 82 can extend from the first portion wall 9 and/or the second portion wall 11. Rib 82 can include a first channel 40 located between and formed from an opening between a channel wall 48 and a lobe 80, where the lobe 80 can include a first traverse wall 42 and a second traverse wall 44 with a connecting wall 46 disposed between the first traverse wall 42 and the second traverse wall 44. The first channel 40 can extend along a portion of a length, $L_p$, of the polymer member 30 and can be located between the channel wall 48 and the first traverse wall 42.

Similarly, the ribs 82 can extend from the second portion wall 11. As illustrated in FIG. 4, rib 82 can include a second channel 50 formed from an opening between a channel wall 48 and a lobe 74 where the lobe 74 can include a first traverse wall 52, a second traverse wall 54, and a connecting wall 56 disposed between the first traverse wall 52 and the second traverse wall 54. The second channel 50 can be located between the channel wall 48 and the second traverse wall 54. The channel wall 48 can extend across the length of the second channel 50. The stiffening elements 90 can extend across the length of the second channel 50. Optionally, additional channels can be formed between the first and second channels 40, 50. For example, as illustrated in FIG. 4, a third channel 76 can be formed from a middle base portion 60 separating the second traverse wall 44 of lobe 80 and the first traverse wall of lobe 74. The lobe 80 can be separated along the h-axis dimension from the lobe 74 by a middle base portion 60 extending between lobe 80 and lobe 74, from the second traverse wall 44 of the lobe 80 to the first traverse wall 52 of the lobe 74. In this way, a channel 76 can be formed between lobe 80 and lobe 74, where the channel 76 has an open side 78 opposite the open side 32 of the polymer member 30. A first base portion 64 can extend from the first traverse wall 42 of lobe 80 and can connect to a first curved portion 67 extending from the middle base portion 60. A second base portion 62 can extend from the second traverse wall 54 of lobe 74 and can connect to a second curved portion 68 extending from the middle base portion 60. Extension 70 can protrude from the first base portion 64 and extension 72 can extend from the second base portion 62. Extensions 70, 72 can be shaped complimentary to the top side 22 and bottom side 24 of the metal/composite member 20 respectively to facilitate attachment of the metal/composite member 20 to the polymer member 30. Additionally, when the polymer member 30 and the metal/composite member 20 are assembled together, extension 70 can cover the top side 22 of the metal/composite member 20, and extension 72 can cover the bottom side 24 of the metal/composite member 20.

The lobes 74, 80 and/or channels 40, 50, 76 can include the ribs 82. The ribs 82 can extend from the connecting wall 46, 56 of lobes 80, 74, respectively or can be disposed within channels 40, 50, 76, as previously described. The ribs 82 can extend in any dimension within each channel. For example, ribs 82 can extend within the channels in a parallel configuration, such that ribs 82 in the first channel 40 and second channel 50 are parallel to one another. Ribs 82 can be any shape that will help provide the desired structural integrity to the polymer member 30. For example, ribs 82 can have a C-like, I-like, N-like, S-like, T-like, W-like, X-like, Z-like, or similar cross-sectional shape, or a combination comprising at least one of the foregoing cross-sectional shapes in a h-l plane. The polymer member 30 can include a stiffening element 90 which can extend from the first base portion 64 and/or from the second base portion 62. As with the ribs 82, the stiffening element 90 can be any shape that will help provide the desired structural integrity to the polymer member 30. A stiffening element 90 can extend along the base portion 62, 64 and in the depth dimension (along the d-axis dimension). A stiffening element 90 can provide structural reinforcement (e.g., rigidity, torsional stiffness, and the like) to the polymer member 30. The stiffening element 90 can extend over the closed portion 34 of the polymer member 30 as illustrated in FIG. 8.

Figure 9:
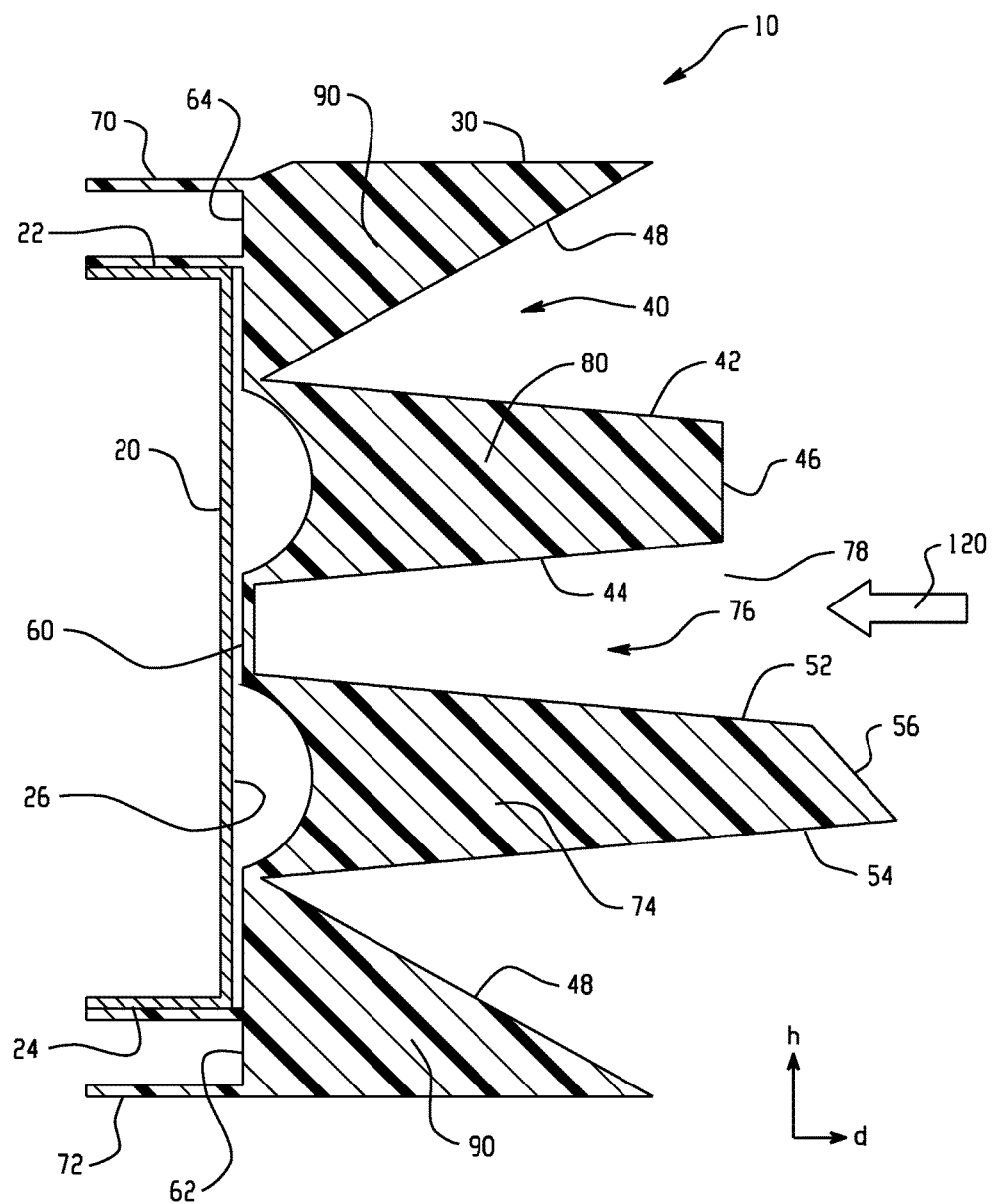
FIG. 9 illustrates a hybrid energy absorbing beam including the polymer member of FIG. 1 and a metal/composite member.
Figure 10:
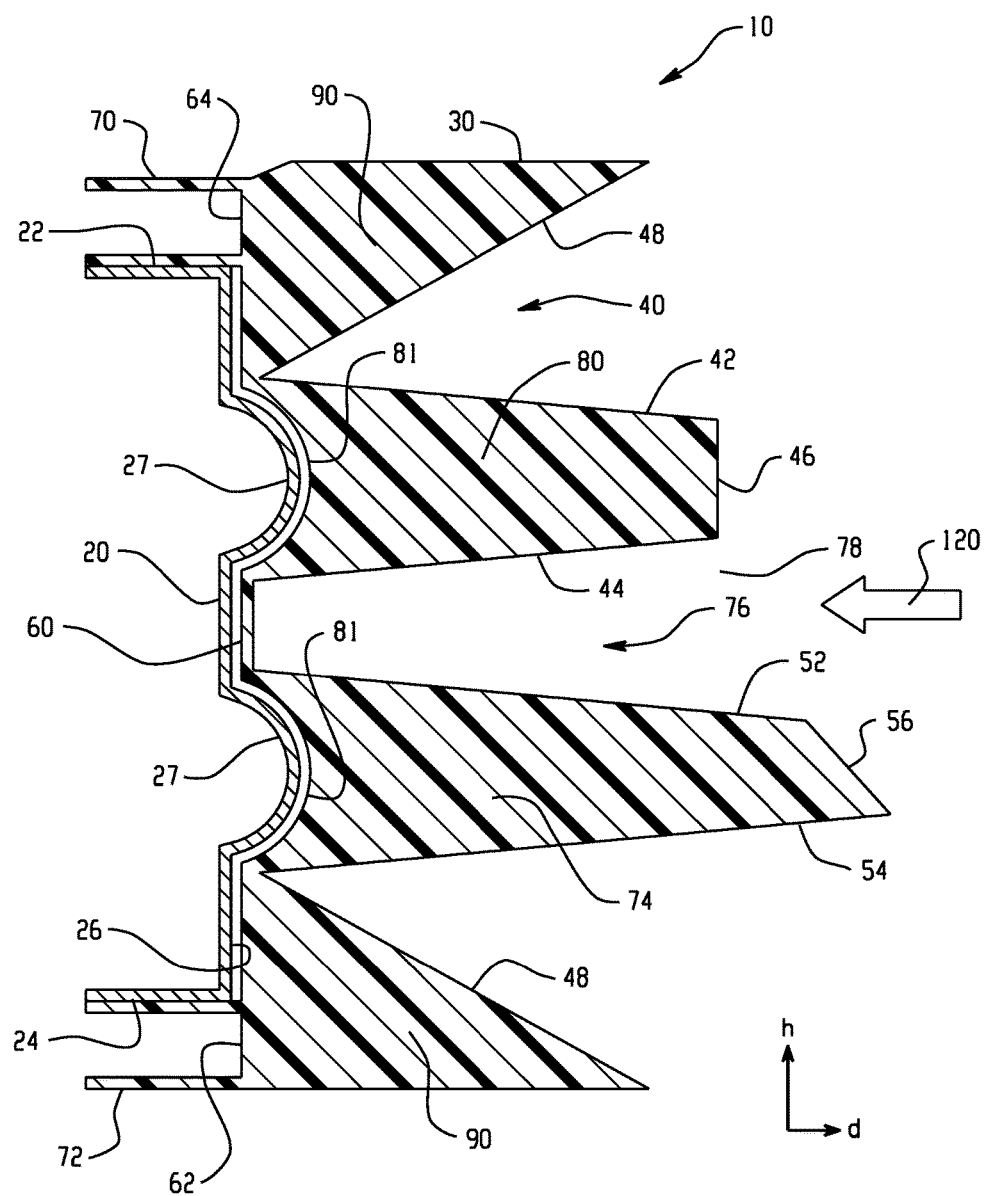
FIG. 10 illustrates another hybrid energy absorbing beam including the polymer member of FIG. 1 and a metal/composite member.
Figure 11:
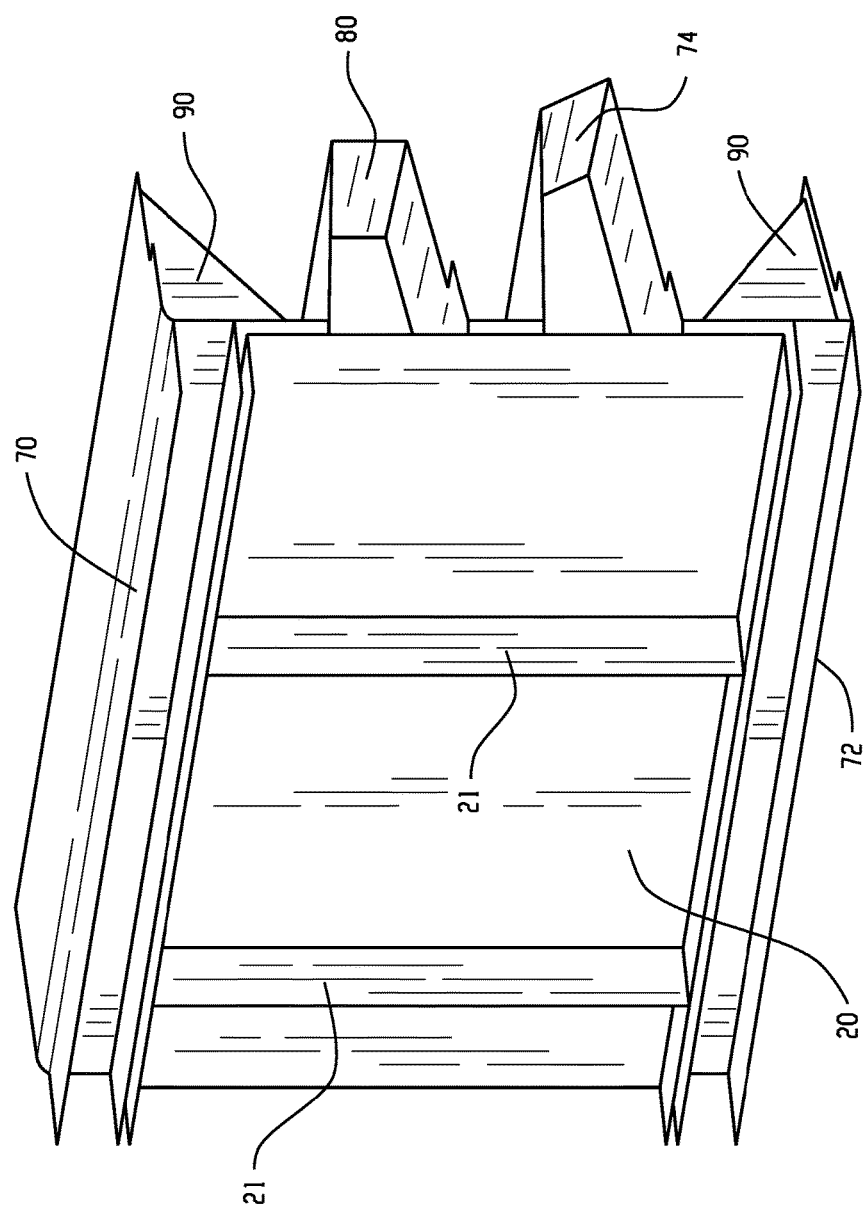
FIG. 11 illustrates an isometric illustration of a hybrid energy absorbing beam with ribs located on a metal/composite member.

FIG. 9 and FIG. 10 illustrate different configurations of the metal/composite member 20. In FIG. 9, the metal/composite member 20 has a C-shaped cross-section with top side 22, front side 26, and bottom side 24 forming the C-shape. In FIG. 9, the metal/composite member 20 has an open section opposite the front side 26. In FIG. 10, the metal/composite member 20 has an open section opposite the front side 26 and support extensions 27 which can be configured to conform to indented portion 81 of lobe 80 and lobe 84. The support extensions 27 can be protruded from a sheet used to make the metal/composite member 20. The metal/composite member 20 as illustrated in FIG. 9 and FIG. 10 can have a greater overall thickness as compared to the metal/composite member illustrated in FIG. 4 due to the open section. Ribs can be located on any side of the metal/composite member 20 in order to increase the stiffness of the metal/composite member 20, if desired. For example, as illustrated in FIG. 11, as illustrated ribs 21 can be on metal/composite member 20. The ribs 21 can be any desired configuration and can be located vertically, horizontally, diagonally, etc. on the metal/composite member 20. As illustrated in FIG. 11, the ribs 21 are located diagonally. The number of ribs can be any number that will provide the desired energy absorption characteristics. It is further contemplated that the metal/composite member 20 can include single or multiple members, e.g., can include a single metal composite member 20 or can include greater than one metal composite member 20 (e.g., two, three, or even five) metal composite members that can be attached by any attachment means that will provide the desired attachment between the members (e.g., bolts, adhesive, etc.).

Figure 5:
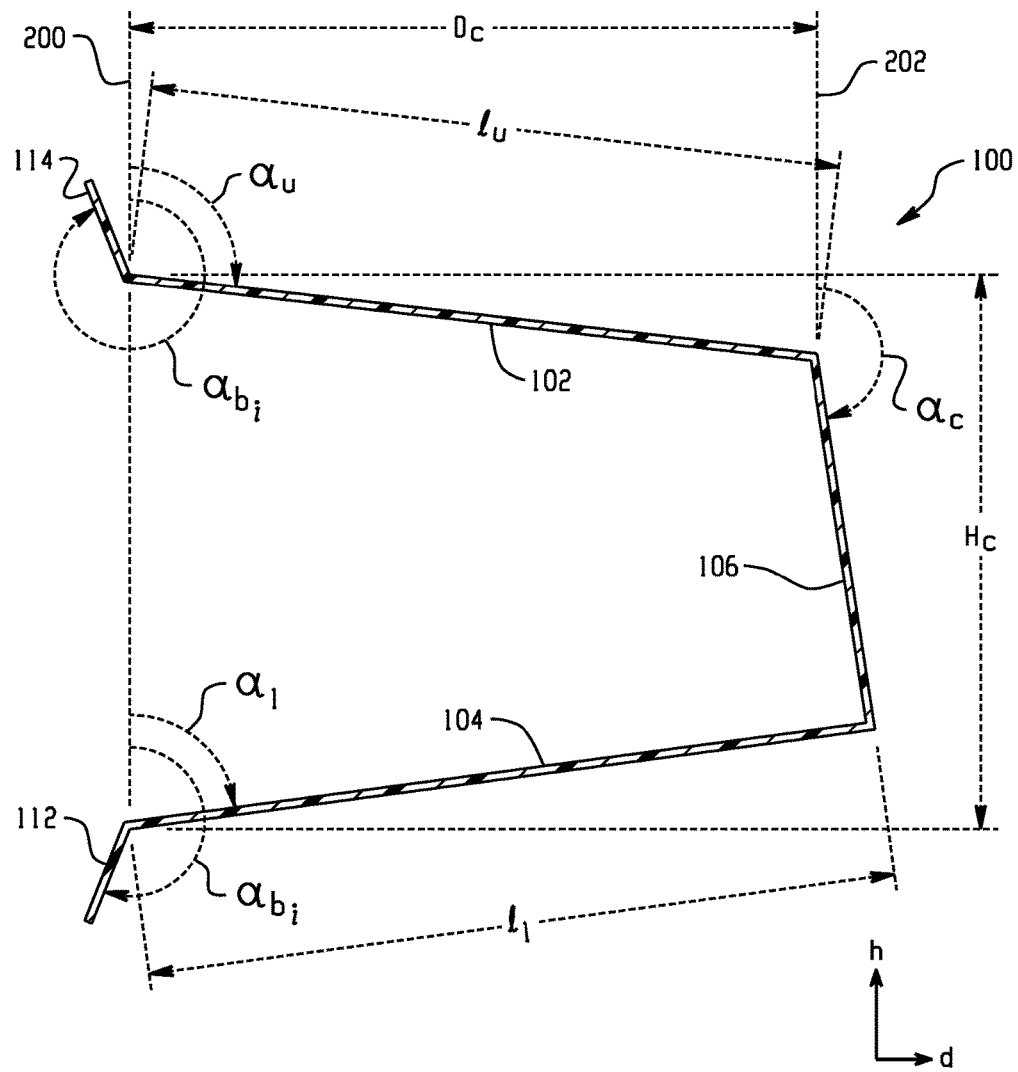
FIG. 5 is a cross-sectional view of a channel of a polymer member of a hybrid energy absorbing beam.

FIG. 5 illustrates a cross-sectional view of a lobe 100, taken along an h-d plane. The lobe 100 can have a height, $H_c$, measured along the h-axis dimension, and a depth, $D_c$, measured along the d-axis dimension. A first traverse wall 102 of the lobe 100 can have a length, $l_u$, measured in the d-h plane and can extend from a first base portion 114 at an angle $\alpha_u$, measured clockwise from reference h-l plane 200. A second traverse wall 104 of the lobe 100 can have a length, $l_l$, measured in the d-h plane and can extend from a second base portion 112 at an angle $\alpha_l$, measured clockwise from reference h-l plane 200. A connecting wall 106 can extend between the first and second traverse walls 102, 104 at an angle $\alpha_c$, measured clockwise from reference h-l plane 202.

The polymer member 30 can include greater than or equal to one lobe 100. Each lobe 100 of a multi-channeled polymer member can have a different shape and/or size with channels formed between adjacent lobes and/or between lobes and stiffening members of the polymer member. In other words, each channel 100 can have a different configuration of the previously mentioned parameters (e.g. angles ($\alpha_u$, $\alpha_l$, $\alpha_c$, and $\alpha_{bi}$), lengths ($l_l$ and $l_u$), depth ($D_c$), and the height ($H_c$) can change along the length, L, of the polymer member (as measured in the l-axis dimension in the attached figures), such that these parameters can be different at two different cross-sections of the polymer member).

The base portions 112, 114 can extend from a traverse wall 102, 104 at an angle, $\alpha_{bi}$, measured clockwise from a reference h-l plane 200, where i can be used to distinguish a specific base portion (e.g. middle, first, second, or any further base portion between two adjacent lobes).

The height, $H_c$, of the lobe 100 can change along the depth, $D_c$, of the lobe 100 and/or along the length of the polymer member, $L_p$. The depth, $D_c$, of the lobe 100 can change along the height, $H_c$, of the lobe 100 and/or along the length of the polymer member, $L_p$. The height, $H_c$, the depth, $D_c$, and/or the open area, $A_c$, of the lobe can change along the length, $L_p$, of the polymer member 30. The angles $\alpha_u$, $\alpha_l$, $\alpha_c$, and/or $\alpha_{bi}$ can change along the length, $L_p$, of the polymer member 30.

Figure 6:
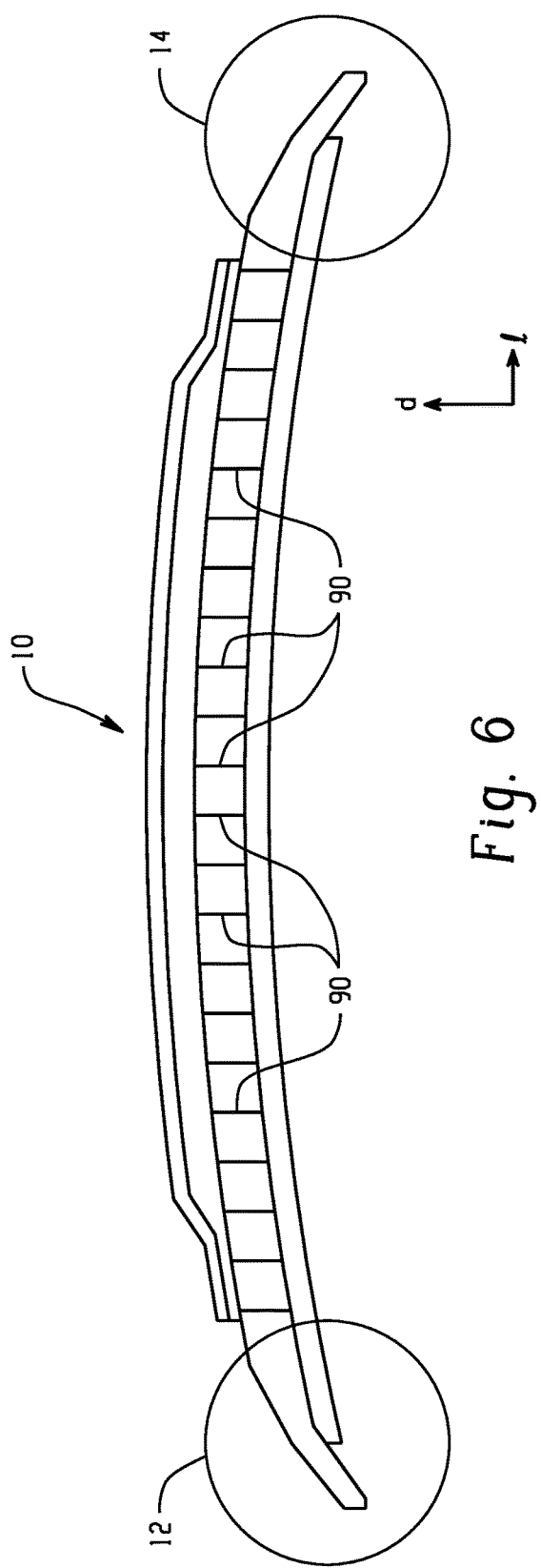
FIG. 6 is a top view of the hybrid energy absorbing beam of FIG. 3.

FIG. 6 illustrates a top view of the hybrid energy absorbing beam 10 of FIG. 3. The hybrid energy absorbing beam 10 is curved along its length, i.e., as the beam extends in the l-axis dimension. Stiffening elements 90 can extend in the d-axis dimension. The channel depth, Dc, as measured in the d-axis dimension, can decrease at beam ends 12, 14 such that the size of a lobe can reduce towards each beam end 12, 14.

Figure 7:
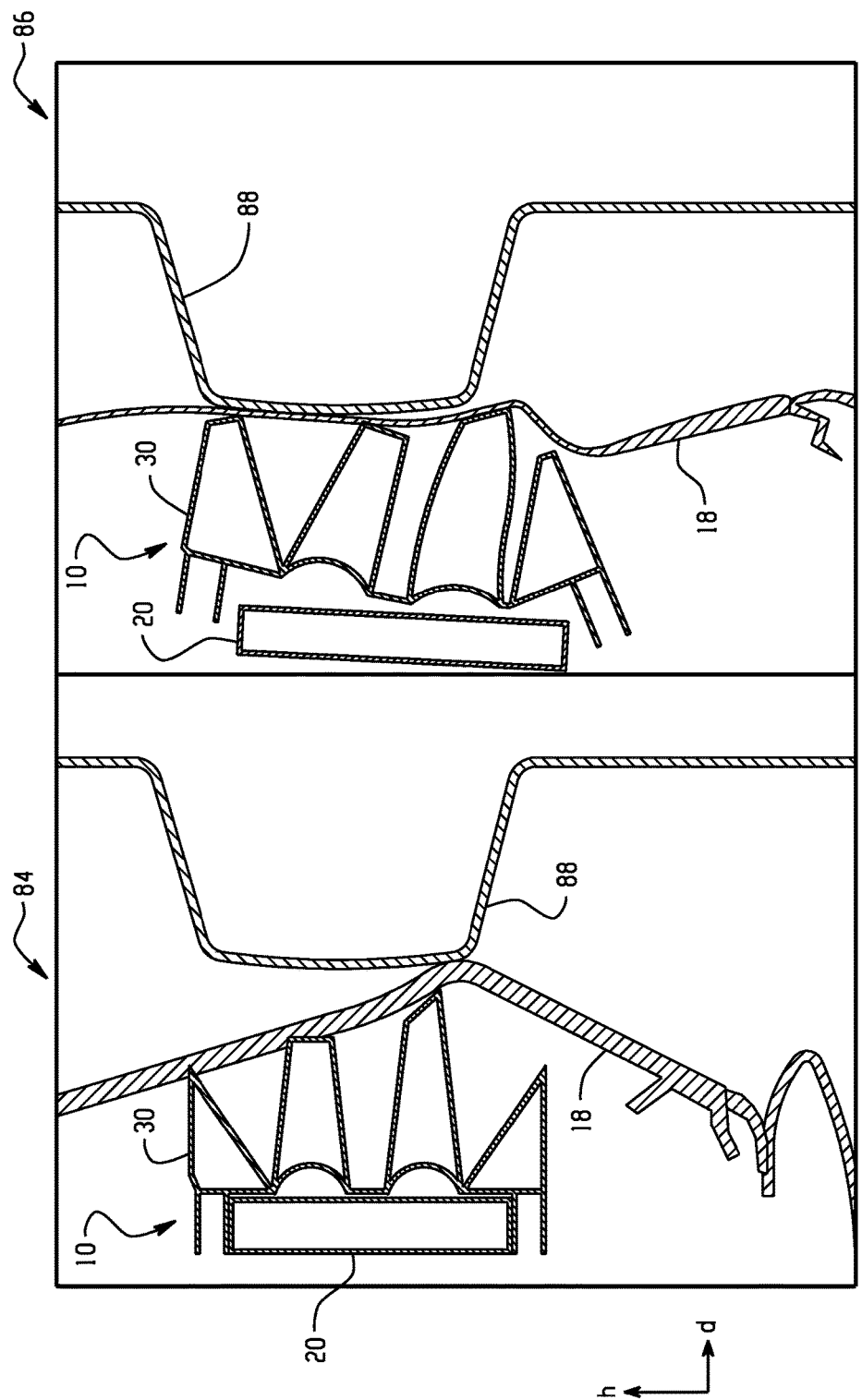
FIG. 7 is a cross-sectional view of a rear bumper having a hybrid energy absorbing beam setup for an ECE 42 pendulum impact test.

FIG. 7 illustrates hybrid energy absorbing beam 10 positioned on the rear end of a vehicle, behind a vehicle rear fascia 18. FIG. 7 shows a cross-sectional illustration prior to impact 84 with pendulum 88, and after impact 86 with pendulum 88. As can be seen from FIG. 7, during impact, crushing of the members of the hybrid energy absorbing beam occurs stage-wise, when the members come into contact with another object.

The polymer member and the metal/composite member can be manufactured separately then secured together, for example by physical engagement, by fastening means or by welding. Processes to make the metal/composite member can include bending, rolling, or hydroforming. The polymer member can be manufactured by using an injection molding processes. The polymer member can be over-molded over the metal/composite member forming a unitary structure.

The hybrid beam can comprise vehicle attachment means for securing the beam to the rails of the vehicle. For example, a small metallic piece can be welded on either ends of the beam to mount it over the flat rail supports. Alternatively, the rail support can be rotated so that its flat surface is coplanar with the vertical surface of the metal beam at either ends.

The hybrid beam can be configured for attachment to a front end module and/or a rear end module. A front end and/or rear end module can include a multi-piece assembly. A front end or rear end module can integrate a large number of components into a single assembly. A front end module and/or rear end module can be supplied to a vehicle manufacturer as a sub-assembly that can then be installed onto a vehicle. A front end module and/or rear end module can include lighting assemblies and/or components, radiators, hoses, cooling fans, air conditioning components, a grille, grille-opening reinforcement panels, crumple zones, bumper beams, bumper assemblies, energy absorbing assemblies, decorative fascia, hood latches, washer bottles, electronics, wiring, and the like. The components of a front end or rear end module can vary by supplier tier level and by vehicle manufacturer. The use of front and/or rear end modules rather than piecemeal assembly can reduce assembly labor, assembly time, and/or assembly steps (processes) at a vehicle manufacturer's assembly line.

The structure of front end module and/or rear end module can be standardized and can allow common designs to be used across multiple models sold into multiple geographies. This can provide cost savings to a vehicle manufacturer. Model differentiation can be achieved by varying skins and/or cosmetic treatments. Front end modules and/or rear end modules can allow vehicle manufacturers a global vehicle platform while allowing for model variation (or versions) that can differ between localities (e.g. geographically).

A fascia can envelope the beam such that the beam can not be visible once attached to the vehicle. The fascia can be formed from a thermoplastic material and can undergo a finishing process utilizing conventional vehicle painting and/or coating techniques.

A hybrid energy absorbing beam can absorb impact energy at low and/or moderate speeds. It can be used for vehicles to minimize the damage to the vehicles and/or pedestrians during low-speed and/or moderate-speed impacts. A hybrid energy absorbing beam can be configured as a stationary barrier (e.g. car park barrier, road divider, road barrier, and the like) to absorb energy in any impact event where the impact energy needs to be absorbed by the hybrid beam structures via bending.

The energy absorbing beam is further illustrated by the following non-limiting examples.

EXAMPLES

Simulation studies were conducted to quantify the effectiveness of the hybrid beam in absorbing energy at moderate impacts.

A hybrid beam, as shown in FIG. 3, is mounted on a generic vehicle with a mass of 1600 kilogram (kg). The hybrid beam comprises approximately 3 kg-6 kg of plastic material and 3 kg of steel. The resulting vehicle is evaluated for ECE42 center pendulum impact performance and IIHS deformable barrier impact performance. The configuration prior to impact test and the resultant configuration are shown in FIG. 7.

It is observed that the hybrid beam passes both the ECE42 center pendulum impact tests and the IIHS 10 km/h impact tests by maintaining the allowable intrusion levels. In addition, it is observed that the hybrid beam mass to meet the requirements is dependent on the vehicle mass, and for a vehicle with higher mass, the mass of the hybrid beam may have to be increased appropriately.

The hybrid energy absorbing beams and methods of making include at least the following embodiments:

Embodiment 1

A hybrid energy absorbing beam for attachment to a vehicle, comprising: a polymer member, wherein the polymer member comprises a first portion, wherein the first portion includes a first ledge and a connecting ledge connected by a first portion wall; and a rib extending from the first portion wall, wherein a cross-section of the rib taken along a line, A-A, comprises a first channel formed from an opening between a channel wall and a first traverse wall of a lobe, wherein the lobe comprises the first traverse wall and a second traverse wall with a connecting wall disposed between the first traverse wall and the second traverse wall; wherein the first channel extends along a portion of a length, $L_p$, of the polymer member; and a metal/composite member coupled to the polymer member on an opposite side of the polymer member as the connecting wall.

Embodiment 2

The hybrid energy absorbing beam of Embodiment 1, wherein the polymer member further comprises a second portion, wherein the second portion includes a second ledge and the connecting ledge connected by a second portion wall; and rib extending from the second portion wall, wherein a cross-section of the rib taken along a line, A-A, comprises a second channel formed from an opening between a channel wall and a lobe, wherein the lobe comprises a first traverse wall and a second traverse wall with a connecting wall disposed between the first traverse wall and the second traverse wall.

Embodiment 3

The hybrid energy absorbing beam of Embodiment 2, wherein ribs extend between the channel wall and the second traverse wall of the lobe.

Embodiment 4

The hybrid energy absorbing beam of any of Embodiments 2-3, further comprising a middle base portion extending between the second traverse wall of lobe and the first traverse wall of the lobe, forming a third channel located between the first channel and the second channel.

Embodiment 5

The hybrid energy absorbing beam of any of Embodiments 2-4, wherein ribs disposed in the first channel and ribs disposed in the second channel are substantially parallel.

Embodiment 6

The hybrid energy absorbing beam of any of Embodiments 2-5, wherein the lobe(s) have a C-shaped cross-section.

Embodiment 7

The hybrid energy absorbing beam of any of Embodiments 1-6, wherein the polymer member is curved along its length.

Embodiment 8

The hybrid energy absorbing beam of any of Embodiments 1-7, wherein the metal/composite member is inserted into the polymer member.

Embodiment 9

The hybrid energy absorbing beam of any of Embodiments 2-7, wherein the polymer member further comprises a first base portion and a second base portion wherein the first base portion and the second base portion are connected by the middle base portion wherein a first curved portion extends from a side of the middle portion to reach the first base portion and wherein a second curved portion extends from a side of the middle portion to reach the second base portion; and wherein the first base portion and the second base portion are in mechanical communication with the metal/composite member.

Embodiment 10

The hybrid energy absorbing beam of any of Embodiments 1-9, wherein the polymer member further comprises stiffening elements extending from the first base portion and/or extending from the second base portion.

Embodiment 11

The hybrid energy absorbing beam of any of Embodiments 1-10, wherein the polymer member comprises a thermoplastic material.

Embodiment 12

The hybrid energy absorbing beam of any of Embodiments 1-11, wherein the polymer member is injection molded.

Embodiment 13

The hybrid energy absorbing beam of any of Embodiments 1-12, wherein the metal/composite member has a substantially I-shaped cross-section or a substantially rectangular cross-section.

Embodiment 14

The hybrid energy absorbing beam of any of Embodiments 1-13, wherein the metal/composite member comprises a steel alloy.

Embodiment 15

The hybrid energy absorbing beam of any of Embodiments 1-14, wherein the metal/composite member is formed by bending, rolling, or hydroforming.

Embodiment 16

The hybrid energy absorbing beam of any of Embodiment 1-15, wherein the polymer member and the metal/composite member form an over-molded unitary structure.

Embodiment 17

A bumper assembly, comprising: a hybrid energy absorbing beam of any of Embodiments 1-16; and a fascia covering a portion of the beam.

Embodiment 18

The bumper assembly of Embodiment 17, wherein the hybrid energy absorbing beam is configured for attachment to a vehicle front end module and/or a vehicle rear end module.

Embodiment 19

A method of making a hybrid energy absorbing beam, comprising: forming a polymer member comprising a first portion, wherein the first portion includes a first ledge and a connecting ledge connected by a first portion wall; and a rib extending from the first portion wall, wherein a cross-section of the rib taken along a line, A-A, comprises a first channel formed from an opening between a channel wall and a first traverse wall of a lobe, wherein the lobe comprises the first traverse wall and a second traverse wall with a connecting wall disposed between the first traverse wall and the second traverse wall; wherein the first channel extends along a portion of a length, $L_p$, of the polymer member; and forming a metal/composite member; and attaching the polymer member to the metal/composite member on an opposite side of the polymer member as the connecting wall.

Embodiment 20

The method of Embodiment 19, wherein the polymer member is over-molded the metal/composite member.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. A hybrid energy absorbing beam for attachment to a vehicle, comprising:
   a polymer member, wherein the polymer member comprises
      a first portion, wherein the first portion includes a first ledge and a connecting ledge connected by a first portion wall; and
      a rib extending from the first portion wall, wherein a cross-section of the rib taken along a line, A-A, comprises
         a first channel formed from an opening between a channel wall and a first traverse wall of a lobe, wherein the lobe comprises the first traverse wall and a second traverse wall with a connecting wall disposed between the first traverse wall and the second traverse wall; wherein the first channel extends along a portion of a length, $L_p$, of the polymer member; and
   a metal and/or composite member coupled to the polymer member on an opposite side of the polymer member from the connecting wall.

2. The hybrid energy absorbing beam of claim 1, wherein the polymer member further comprises
   a second portion, wherein the second portion includes a second ledge and the connecting ledge connected by a second portion wall; and
   a rib extending from the second portion wall, wherein a cross-section of the rib taken along a line, A-A, comprises
      a second channel formed from an opening between a channel wall and a lobe, wherein the lobe comprises a first traverse wall and a second traverse wall with a connecting wall disposed between the first traverse wall and the second traverse wall.

3. The hybrid energy absorbing beam of claim 2, wherein the ribs extend between the channel wall and the second traverse wall of the lobe.

4. The hybrid energy absorbing beam of claim 2, further comprising a middle base portion extending between the second traverse wall of the lobe and the first traverse wall of lobe, forming a third channel located between the first channel and the second channel.

5. The hybrid energy absorbing beam of claim 2, wherein the ribs disposed in the first channel and ribs disposed in the second channel are substantially parallel.

6. The hybrid energy absorbing beam of claim 2, wherein the lobe has a C-shaped cross-section.

7. The hybrid energy absorbing beam of claim 1, wherein the polymer member is curved along its length.

8. The hybrid energy absorbing beam of claim 1, wherein the metal and/or composite member is inserted into the polymer member.

9. The hybrid energy absorbing beam of claim 2, wherein the polymer member further comprises
  a first base portion and a second base portion wherein the first base portion and the second base portion are connected by the middle base portion wherein a first curved portion extends from a side of the middle portion to reach the first base portion and wherein a second curved portion extends from a side of the middle portion to reach the second base portion; and
  wherein the first base portion and the second base portion are in mechanical communication with the metal and/or composite member.

10. The hybrid energy absorbing beam of claim 1, wherein the polymer member further comprises stiffening elements extending from the first base portion and/or extending from the second base portion.

11. The hybrid energy absorbing beam of claim 1, wherein the polymer member comprises a thermoplastic material.

12. The hybrid energy absorbing beam of claim 1, wherein the polymer member is injection molded.

13. The hybrid energy absorbing beam of claim 1, wherein the metal and/or composite member has a substantially I-shaped cross-section or a substantially rectangular cross-section.

14. The hybrid energy absorbing beam of claim 1, wherein the metal and/or composite member comprises a steel alloy.

15. The hybrid energy absorbing beam of claim 1, wherein the metal and/or composite member is formed by bending, rolling, or hydroforming.

16. The hybrid energy absorbing beam of claim 1, wherein the polymer member and the metal and/or composite member form an over-molded unitary structure.

17. A bumper assembly, comprising:
  a hybrid energy absorbing beam of claim 1; and
  a fascia covering a portion of the beam.

18. The bumper assembly of claim 17, wherein the hybrid energy absorbing beam is configured for attachment to a vehicle front end module and/or a vehicle rear end module.

19. A method of making a hybrid energy absorbing beam, comprising:
  forming a polymer member comprising a first portion, wherein the first portion includes a first ledge and a connecting ledge connected by a first portion wall; and a rib extending from the first portion wall, wherein a cross-section of the rib taken along a line, A-A, comprises a first channel formed from an opening between a channel wall and a first traverse wall of a lobe, wherein the lobe comprises the first traverse wall and a second traverse wall with a connecting wall disposed between the first traverse wall and the second traverse wall; wherein the first channel extends along a portion of a length, $L_p$, of the polymer member; and
  forming a metal and/or composite member; and
  attaching the polymer member to the metal and/or composite member on an opposite side of the polymer member as the connecting wall.

20. The method of claim 19, wherein the polymer member is over-molded the metal and/or composite member.

* * * * *